April 29, 1924.

L. E. O. WALKER

SPOTLIGHT

Filed May 19, 1922

Inventor
Luther E. O. Walker

By Lancaster and Allwine
Attorneys

April 29, 1924.

L. E. O. WALKER

SPOTLIGHT

Filed May 19, 1922

Inventor
Luther E. O. Walker
By Lamaster and Allwine
Attorneys

Patented Apr. 29, 1924.

1,491,937

UNITED STATES PATENT OFFICE.

LUTHER E. O. WALKER, OF GARY, INDIANA.

SPOTLIGHT.

Application filed May 19, 1922. Serial No. 562,105.

*To all whom it may concern:*

Be it known that I, LUTHER E. O. WALKER, a citizen of the United States, residing at Gary, in the county of Lake and State of Indiana, have invented certain new and useful Improvements in Spotlights, of which the following is a specification.

This invention relates to an improved spot light for use in connection with automotive vehicles.

The primary object of the invention is the provision of a spot light particularly well adapted for use in connection with sedans and other types of closed vehicles, whereby the same can be conveniently mounted upon the top thereof and operated from within the vehicle for movement in different planes.

A further object of the invention is the provision of an improved spot light including a lamp, and improved means for oscillating the same in different planes of movement.

A further object of the invention is the provision of a spot light adapted for use upon the top of a vehicle, including improved means for regulating the movement of the spot light in vertical or horizontal planes, whereby light rays may be thrown forwardly of the vehicle to aid in propelling the same.

A further object of the invention is the provision of a spot light, so mounted upon a motor vehicle that when operating the same will not interfere with the driver's operation of the vehicle nor interfere with traffic.

Other objects and advantages will, of course, be apparent during the following detailed description.

In the accompanying drawings, forming a part of this specification, and wherein similar reference characters designate corresponding parts throughout the several views.

Figure 1:
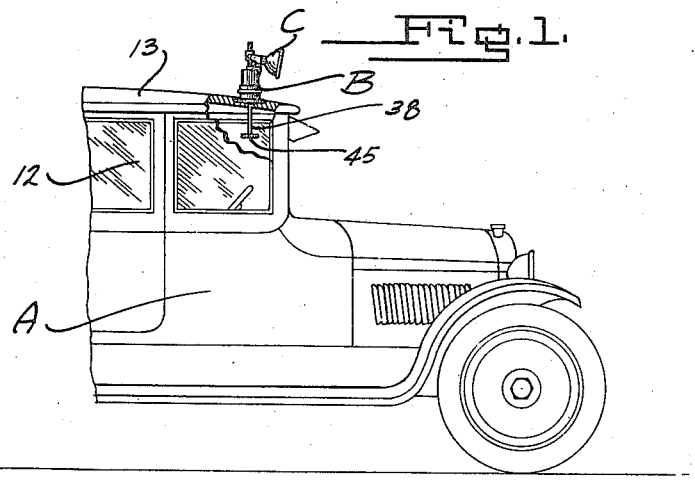
Figure 1 is a fragmentary side elevation of an enclosed type of vehicle, showing the improved spot light mounted upwardly thereon.
Figure 2:
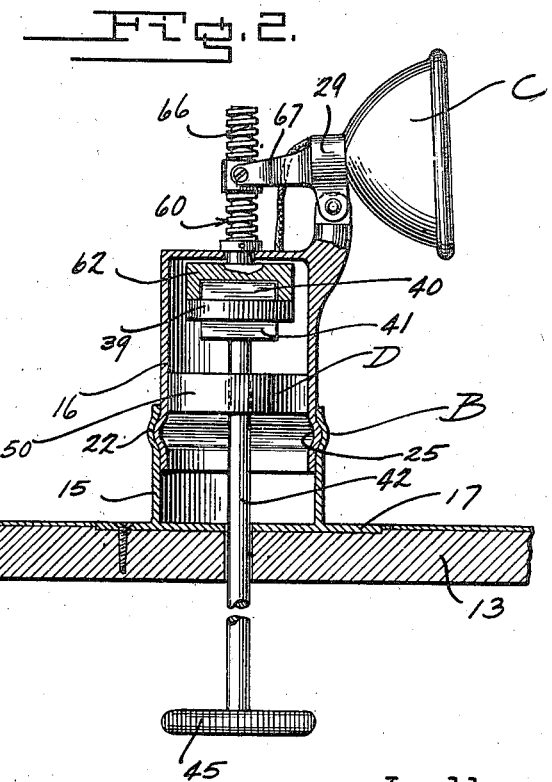
Figure 2 is a vertical sectional view taken through the improved spot light showing the various cooperating details thereof in position for operating the lamp portion of the spot light in a vertical plane.

In the drawings, wherein for the purpose of illustration is shown the preferred embodiment of the improved spotlight, the letter A designates a vehicle, having the support B mounted thereon for mounting of the lamp C upwardly thereof. The operating mechanism D is preferably carried by the support B and lamp C for operation of the latter in different planes of movement.

The improved spot light arrangement B, of course, may be mounted upon any type of motor vehicle or other object. However, it will find its best use upon those types of motor vehicles having enclosed bodies. The ordinary spotlight used laterally of the windshield cannot be properly controlled by the drivers of closed cars, since the side panels thereof interfere with operation of the same. As is illustrated in Figure 1, the motor vehicle A is of the closed car type, including the enclosing panels 12 and roofing structure 13.

The support B preferably includes a fixed casing portion 15 and a movable portion 16. The portion 15 includes a base 17 adapted for countersunk attachment in the top surface of the roof 13. This portion 15 preferably includes the upstanding annular flange 18 centrally disposed upon the base 17, so that screws 20 or the like may be attached to the portion of the base 17 which extends outwardly from the upstanding annular flange 18. This flange 18 is provided adjacent its upper marginal edge 21 with an outwardly bulging annular portion 22 adapted as a seat for the reception of a portion of the movable support 16.

The movable support portion 16 is preferably of cylindrical formation, and is open from the lower end, having an outwardly extending annular bulge 25 adapted for seating within the depression caused by the other bulge 22. In this manner, the upper part 16 of the support may be rotatably connected to the fixed lower support portion 15; said support portions 15 and 16, in fact, providing a cylindrical shaped casing adapted for containing the clutch operating mechanism D to be subsequently described.

The lamp C may be of any approved construction, including a casing 28, which slopes rearwardly to an attaching collar 29. This attaching collar 29 is preferably provided with a pair of depending arms 30 and 31, having a pin or other element 32, extending transversely therebetween. The space intermediate the depending arms 30 and 31 is provided for receiving a standard 33 which extends upwardly and is preferably rigid with the moving casing portion 16. The upper end of this standard 33 may be reduced and provided with an elongated slot 35, through which the pin 32 extends so that the lamp C is oscillatively pivoted to the movable casing portion 16 for movement in a substantially vertical plane.

Referring to the operating mechanism D, the same may include a slidable clutch member 38, including a head 39 formed with the top and bottom key portions 40 and 41 respectively.

A shaft 42 extends from the lower portion 39 and is reciprocably mounted through an opening 44 which extends axially of the support portions 15 and 16, through the base 17 and top 13 of the vehicle A. A hand engaging wheel 45 may be fixedly keyed, as at 46, to the lower end of the depending shaft 42, interiorly of the vehicle A and at a point conveniently disposed for operation by the driver of the vehicle A. It is to be noted that this clutch member 38 may either be rotated, or slid longitudinally with respect to the support B.

A member 50 is preferably provided within the movable support portion 15, and in fact, may be a part thereof, the same having a depression 51 of polygonal formation, in the upper face thereof, adapted for snug reception of the key 41 formed upon the lower part of the clutch head 39. This clutch member 50 slidably receives the shaft 42 of the first mentioned clutch member 38, and whereby the key 41 may be selectively disposed within the depression 51 provided therefor. When the key 41 is so disposed within the depression 51 manual rotation of the clutch member 38 will oscillate or rotate the upper casing portion 16 within the fixed casing or support portion 15, and whereby the lamp C may be swung about the axis of the support B in substantially a horizontal plane.

It will of course, be desirable, to move the lamp C in a vertical plane. To secure such an adjustment, an element 60 is rotatably mounted in the top 61 of the movable support portion 16, including a clutch member 62 which depends within the casing formed by the support B, having a depression 63 formed in the lower face thereof and in which the key portion 40 of the first mentioned clutch portion 39 is adapted to co-act. While the element 60 is axially rotatable with respect to the support B, a collar 65 is disposed outwardly upon the top surface of the support top 61, to prevent longitudinal movement of the clutch member 62 within the support B. The element 60 furthermore includes an upstanding screw threaded stem 66 axially disposed of the support B, and of course, movable with the clutch member 62. The lamp C cooperates with the upstanding screw threaded stem 66, in that a forked portion 67 is formed upon the collar 29 thereof, to have the arms 68 and 69 extending in the direction of the screw threaded stem 66. A nut 70 in screw threaded engagement with the stem 66 is preferably oscillatively pivoted to these arms 68 and 69, as by the screw or pin elements 71.

As can readily be seen from Figure 1 of the drawings, the lens of the lamp C is directed forwardly of the motor vehicle A and in the direction of travel of the same.

Figure 3:
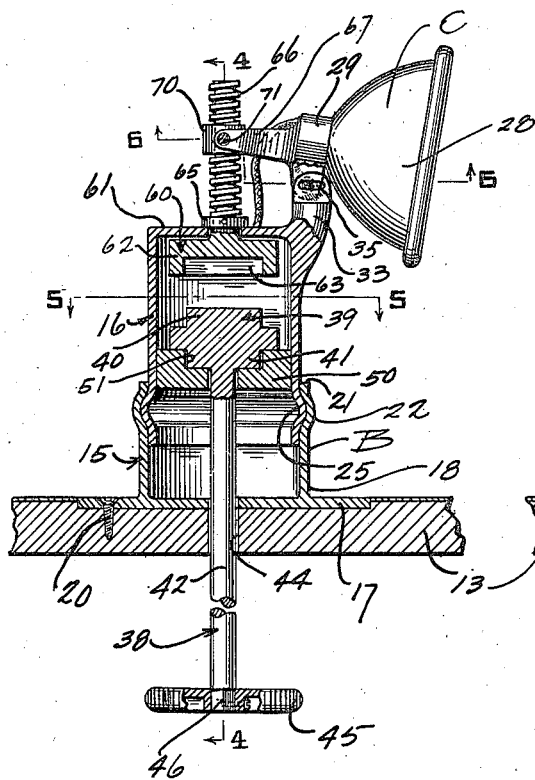
Figure 3 is a vertical cross sectional view, altogether similar to the view illustrated in Figure 2, however, showing the details associated for movement of the lamp in a transverse or horizontal plane.
Figure 4:
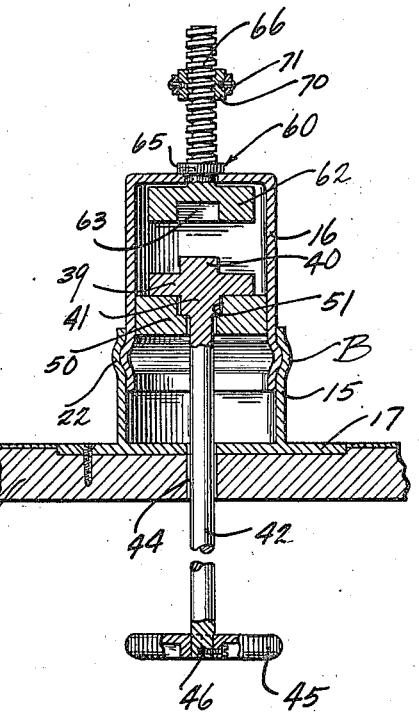
Figure 4 is a transverse cross sectional view, taken substantially on the line 4—4 of Figure 3.
Figure 5:
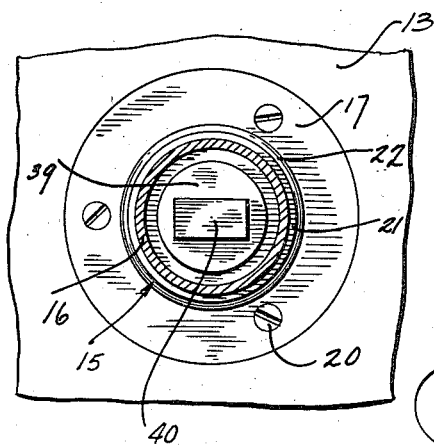
Figure 5 is a cross sectional view taken substantially on the line 5—5 of Figure 3.
Figure 6:
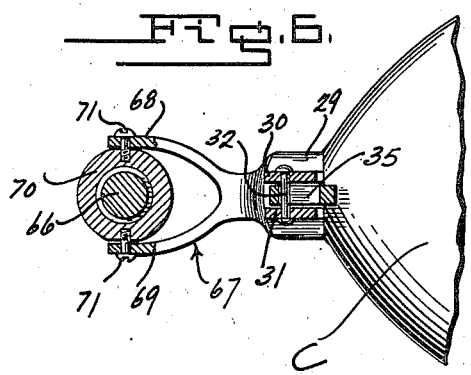
Figure 6 is a transverse cross sectional view taken on the line 6—6 of Figure 3.

By an angular movement of the operator's hand, the clutch member 38 may be moved, when in the position illustrated in Figures 3 or 4, so that the upper support or casing portion 16 may be oscillated or rotated about the axis formed by the support B, and since the lamp is mounted upon the standard 33 it is obvious that such rotary movement of the upper casing portion 16 will swing the lamp C in a horizontal plane of movement. On the other hand, assuming that it is the operator's intention to focus the lamp C which would require a vertical movement of the same, it is merely necessary for the operator within the vehicle A to slide the clutch member 38 axially within the support B, so that the key portion 40 thereof engages in the polygonal depression 63 provided in the upper cooperating clutch member 62. After this has been done, an angular movement of the operator's hand will rotate the screw threaded stem 66 about its axis, so that the nut 70 is adjusted, either upwardly or downwardly thereon, according to the direction of rotation of the clutch member 38. It is obvious that such longitudinal movement of the adjusting nut 70 upon the stem 66 will rock or oscillate the lamp C upon its standard 33 in a vertical plane of movement. Since it is desirable that the lamp C be affixed to the adjusting nut 70 by means of the relatively small securing pins 71, it will be desirable for the pivot pin 32 above described, to be slidable within the longitudinal slot 35, in order to compensate for vertical travel of the lamp C.

From the foregoing it can be seen that a search light or spot light has been provided, in which the lamp thereof may be adjusted in a number of different planes of movement, by means of a selective clutch mechanism.

Various changes in the shape, size and arrangement of parts may be made to the form of the invention herein shown and described, without departing from the spirit of the invention or the scope of the claims.

I claim:

1. A spotlight comprising a support including a stationary section and a movable section rotatably mounted upon said stationary section, a lamp oscillatively mounted upon said movable section for vertical tilting movement, lamp adjusting means rotatably carried by said movable section and connected with said lamp for tilting the lamp vertically when said means is rotated, a clutch member forming part of said lamp adjusting means, a clutch member carried by said rotatable section of said support, and a device for selectively engaging the clutch member of said lamp adjusting means or the clutch member of the rotatable section of said support whereby the lamp may be selectively swung horizontally or vertically.

2. A spotlight comprising a support including stationary and movable portions, a clutch member fixed in said movable portion of the support, a second clutch member rotatably mounted in the movable portion of said support, a lamp oscillatively pivoted on the movable part of the support, a third clutch member slidably mounted intermediate said first and second clutch member, and means connecting said second mentioned clutch member and lamp for rocking of the latter upon movement of said second clutch member by movement of said third clutch member.

3. A spotlight comprising a rotatable support, a clutch carried thereby, a lamp pivoted on said rotatable support, a lamp adjusting element rotatably carried by said rotatable support and including a clutch portion positioned above the clutch of said support and a shank, means connecting the shank with said lamp for imparting tilting movement to the lamp when the lamp adjusting element is rotated, and a rotatably and slidably mounted operating element carried by said rotatable support for selective engagement with the clutch of the support or clutch portion of the lamp adjusting element whereby the lamp may be selectively swung horizontally or vertically.

4. A spot light comprising a support including fixed and movable portions, a lamp pivotally mounted upon the movable portion of said support, adjustable means mounted upon the movable portion of said support and connecting said lamp including a nut and screw threaded stem, a clutch member fixedly carried by said movable support, and a sliding clutch member for selective engagement with the clutch member of the movable support portion or the adjusting means for regulation of the lamp in different planes of movement.

5. A search light comprising a movable support, a lamp pivoted on the movable support, an element rotatably mounted upon the support including a clutch member extending therein, and a screw threaded shank extending outwardly thereof, an adjusting nut engaging said screw threaded stem and pivotally mounted to the lamp, and clutch means carried by said support for selective engagement with the clutch member formed with said screw threaded stem, whereby the clutch member may be moved for adjusting the position of the lamp.

6. A search light comprising a casing including fixed and movable portions, said movable portion being rotated upon said fixed portion, a clutch member formed rigid with said movable casing portion, an element rotatably mounted upon the top of said movable casing portion including a second clutch member disposed inwardly of the casing, and a screw threaded stem extending outwardly of the casing, a lamp oscillatively pivoted to the rotatable portion of the casing, an adjusting nut pivotally connected to said lamp and adapted for regulation upon the screw threaded stem of said element, and a third clutch member slidably mounted within said casing and adapted for selective engagement with either the first or second mentioned clutch members disposed therein, whereby the lamp may be moved horizontally or vertically.

LUTHER E. O. WALKER.